United States Patent
Blythe et al.

(10) Patent No.: US 7,974,238 B2
(45) Date of Patent: Jul. 5, 2011

(54) MANAGING WIRELESS COMMUNICATION WITH LIMITED CHANNELS

(75) Inventors: Brian J. Blythe, Fort Worth, TX (US); Eduardo M. Hinojosa, Fort Worth, TX (US)

(73) Assignee: Williams-Pyro, Inc., Fort Worth, TX (US)

( * ) Notice: Subject to any disclaimer, the term of this patent is extended or adjusted under 35 U.S.C. 154(b) by 150 days.

(21) Appl. No.: 11/589,613

(22) Filed: Oct. 30, 2006

(65) Prior Publication Data

US 2007/0097748 A1   May 3, 2007

Related U.S. Application Data

(60) Provisional application No. 60/731,958, filed on Oct. 31, 2005.

(51) Int. Cl.
*H04W 4/00* (2009.01)

(52) U.S. Cl. ........ 370/329; 370/336; 370/254; 370/437; 370/522; 370/348; 455/452.1

(58) Field of Classification Search .................. 370/458, 370/343, 329, 254, 348, 522, 336, 437; 455/452.1
See application file for complete search history.

(56) References Cited

U.S. PATENT DOCUMENTS

| | | | | | |
|---|---|---|---|---|---|
| 5,521,925 | A | * | 5/1996 | Merakos et al. | 370/337 |
| 5,790,551 | A | * | 8/1998 | Chan | 370/458 |
| 5,926,469 | A | * | 7/1999 | Norstedt et al. | 370/329 |
| 2006/0256737 | A1 | * | 11/2006 | Choi et al. | 370/254 |

OTHER PUBLICATIONS

International Search Report, PCT/US06/42271, dated Jul. 25, 2007.

* cited by examiner

*Primary Examiner* — Pierre-Louis Desir
(74) *Attorney, Agent, or Firm* — Morani Patent Law, PC

(57) ABSTRACT

Communications between a central station and plural nodes is managed at the central station. The central station has an answer channel, a number of data channels, and a data channel manager. A node transmits a channel request, which is received by the answer channel. The answer channel queries the data channel manager, which determines if a data channel is available. If so, then the answer channel passes the node's request to the open data channel, which then communicates with the node. The answer channel is freed to handle channel requests from other nodes. The node is unaware of the passing off as the node does not change the address for the central station. A data channel is freed to communicate with other nodes by either receiving a disconnect message from the node or by timing out the connection.

4 Claims, 5 Drawing Sheets

Time-out at the Mobile Node

Successful Connection, Data Transfer and Disconnection

Unsuccessful Data Channel Request

Time-out at the Mobile Node

Time-out at the Central Location Side

* The timeout and disconnect may happen before or after the Burst Data process or before the disconnect from the Mobile Node

MANAGING WIRELESS COMMUNICATION
WITH LIMITED CHANNELS

SPECIFICATION

This application claims the benefit of U.S. provisional application Ser. No. 60/731,958, filed Oct. 31, 2005.

FIELD OF THE INVENTION

The invention relates to methods and apparatuses for managing wireless communications between a number of devices, with a limited number of channels.

BACKGROUND OF THE INVENTION

In wireless data transfer, a node communicates wirelessly with a network. Both the node and the network have transceivers. A typical communications scheme involves multiple nodes with a single radio frequency or narrow band of frequencies. The system capacity, as expressed in bandwidth, is limited so that all of the nodes are unable to communicate at the same time with the network. Because of this limitation, a node is unable to have a dedicated communication channel or link to the network; the channels must be shared among the nodes.

To communicate with a network, a node requests a channel from the network. If the request is granted, the channel is established and communication between the node and the network can occur. The request is denied if no channels are available, as all channels will be in use. If the request is denied, then the node will need to continue requesting a connection until the request is granted. This would come when channels are freed.

This is not a particularly efficient method of communicating. A node can tie up a channel even if the channel is not being used. The channel remains open until either the node or the network closes the channel. The availability of channels becomes complicated if the nodes are mobile and move in and out of communication range. A channel may remain open even if the node moves out of communication range. If the node moves back in range, that node may request another channel, thereby tying up two channels. In fringe areas, a node may repeatingly move in and out of range, opening many channels, while not closing any.

What is needed is a more efficient system of managing channels in a communication system.

SUMMARY OF THE INVENTION

It is an object of the present invention to provide a more efficient system of managing channels in communications.

The present invention provides a method of managing the communications in a central station for wireless communications between the central station and plural nodes. An answer channel and data channels are provided. The answer channel receives a channel request from a node. Then, it is determined if a data channel is available. If a data channel is available, then the data channel is used to receive further communications with the node and the answer channel is freed to receive the next channel request. If a data channel is not available, then the request is denied and the answer channel is freed to receive the next channel request.

In one aspect of the present invention, after the step of using the data channel to receive further communications with the node, and after an elapsed period of time has passed, freeing the data channel to receive communications with other nodes.

The present invention also provides a method of managing communications between a central station and plural nodes. At one of the nodes, transmitting a channel request. The channel request is received at the central station through an answer channel. At the central station, it is determined if a data channel is available among a plurality of data channels. If a data channel is available, then the channel request of the one node is passed from the answer channel to the one data channel. The answer channel is capable of handling another channel request from a node. The one data channel transmits an acknowledgement of connection to the one node. The one node transmits data to the central station. The one data channel receiving at the central station the data and sends an acknowledgement to the node.

In accordance with another aspect of the present invention, the nodes moving in and out of communication range with the home station.

In accordance with another aspect of the present invention, the one node transmits a disconnect message after sending data. The data channel receives the disconnect message and disconnects from the one node, wherein the data channel is now capable of communicating with another node.

In accordance with another aspect of the present invention, the one node transmits a disconnect message after an elapsed period of time. The data channel receives the disconnect message and disconnects from the one node, wherein the data channel is now capable of communicating with another node.

In accordance with another aspect of the present invention, after an elapsed period of time from the last communication of the one node, the data channel disconnects from the one node, wherein the data channel is now capable of communicating with another node.

In accordance with another aspect of the present invention, after determining if a data channel is available, if a data channel is not available, then the answer channel declines the request of the one node and becomes capable of handling another channel request from a node.

In accordance with another aspect of the present invention, the one node transmitting data to the central location further comprising the one node transmitting data by burst.

In accordance with another aspect of the present invention, the one node transmits a channel request further comprises transmitting with the channel request a channel address for the central station. The one node transmitting data to the central station further comprises transmitting the data with the channel address.

The present invention also provides a central station that communicates with a plurality of nodes, comprising a transceiver and a a database. A processor comprises an answer channel, data channels and a data channel manager. The answer channel receiving channel requests from the nodes and upon receiving a channel request the answer channel requests an unused data channel from the data channel manager. The data channel manager identifies a data channel that is not engaged in communicating with a node and upon identifying an unengaged data channel provides the data channel identification to the answer channel. The answer channel then passing the data channel request to the unengaged data channel, which data channel communicates with the node.

In accordance with one aspect of the present invention, a database stores data received from the nodes by way of the data channel.

In accordance with another aspect of the present invention, wherein the data channels receive data from the nodes in bursts.

In accordance with another aspect of the present invention, the data channel that communicates with the node ends the communication after a predetermined period of time has elapsed.

DESCRIPTION OF THE PREFERRED EMBODIMENT

The present invention is used to manage communications between multiple, or plural, nodes with a central location. The number of nodes exceeds the number of communications channels.

Figure 1:
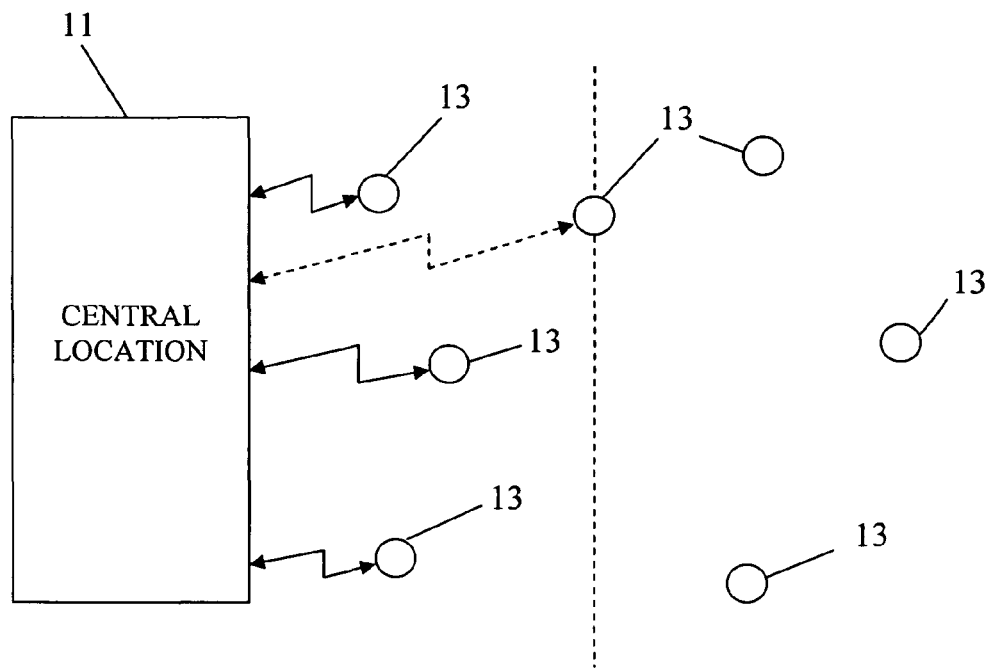
FIG. 1 is a schematic diagram of the communication system of the present invention, in accordance with a preferred embodiment.

FIG. 1 illustrates a system of a number of nodes 13 and a central location 11. The central location need not be geographically surrounded by nodes. The central location is a receiving station. The nodes communicate with the central location in a wireless manner. Typically, a single radio frequency, or a narrow band of frequencies, is used. Some of the nodes 13 (shown to the left of the vertical dashed line in FIG. 1) are in radio or communication range with the central location. Other nodes (shown to the right of the dashed line in FIG. 1) are out of range and consequently cannot communicate with the central location 11. Still other nodes (shown on the dashed line in FIG. 1) are on the edge of the range and may be in intermittent communication with the central location 11. FIG. 1 does not necessarily show all nodes, as the system can have additional nodes.

An example of the communication scheme involves a vehicle depot. Each node 13 is a vehicle with a transceiver. The central location 11 is a service or maintenance station, which manages a fleet of vehicles. As a vehicle is normally used, it is outside of communication range. If the vehicle is brought in for fuel or service, it comes within communication range of the central location 11. When in range, the vehicle node 13 transmits data relating to the vehicle, which data is received, processed and stored by the central location. The data sent by the node may include engine performance, odometer readings, any diagnostic information, etc. After servicing, the vehicle leaves and is out of range once again.

Figure 2:
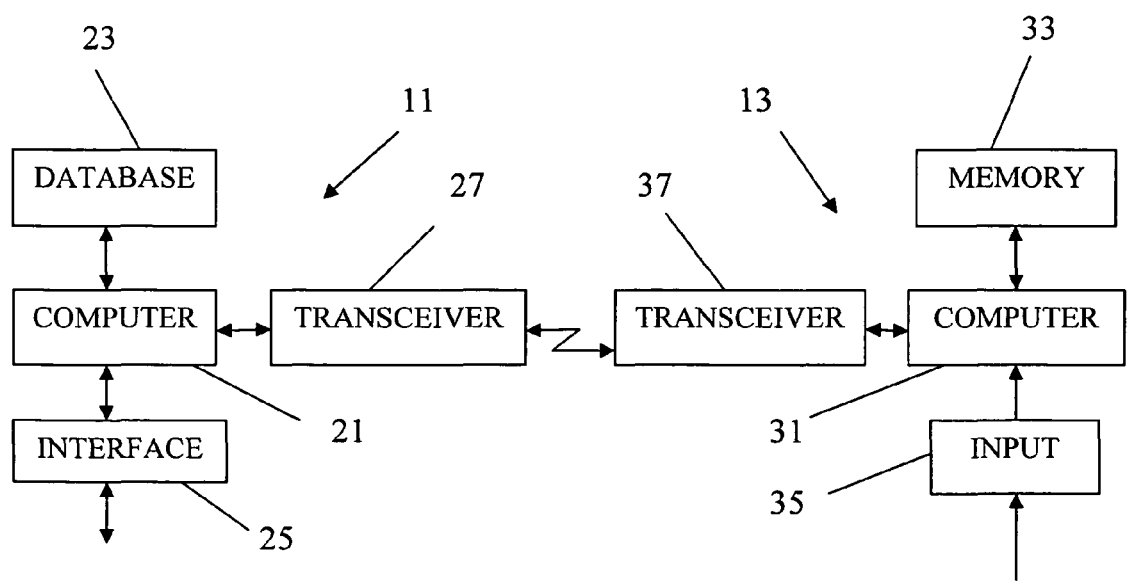
FIG. 2 is a block diagram of the central location and a node.

FIG. 2 shows the components of the central location 11 and a node 13. The central location has a computer, or processor, 21, a database 23, an interface 25 and a transceiver 27. The database 23 resides on a storage device, such as a hard drive or memory. The interface 25 is graphical user interface, with a monitor or display, a keyboard and a mouse. The transceiver 27 is a wireless communications device.

The node 13 has a computer 31, memory 33, an input device 35 and a transceiver 37. The memory 33 can be flash RAM (Random Access Memory) or some other memory device. The input device 35 receives data or information from a source. For example, vehicles have on-board diagnostic computers, known as OBD-II. The on-board diagnostic computer has an output port which is connected to the input device 35. The transceiver 37 communicates with the central location transceiver 27.

Figure 3:
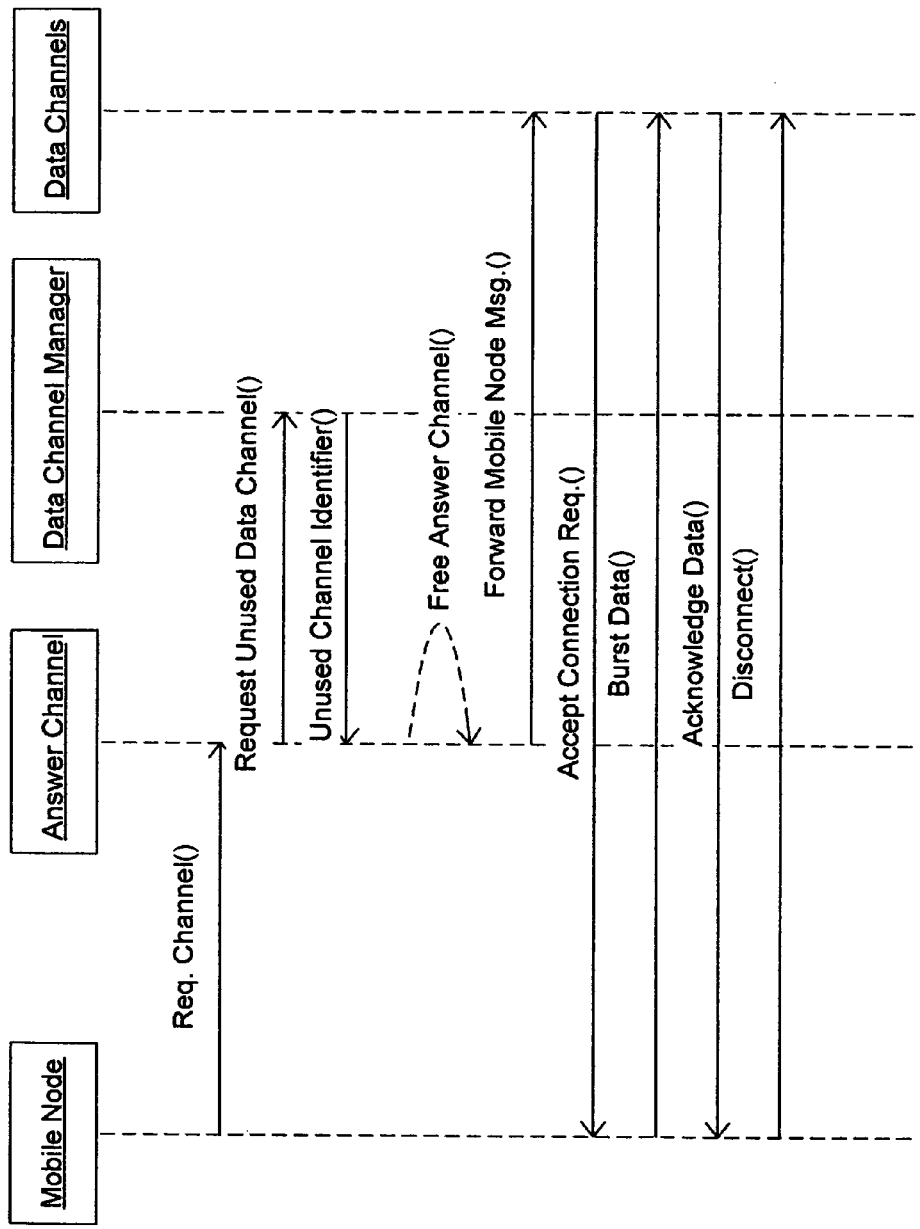
FIG. 3 illustrates a successful connection, data transfer and disconnection.

The central location 11 and the nodes 13 have addresses, or unique, individualized identifiers. An address is similar to an internet protocol address used on the worldwide web or on ethernets. The identification is unique to each node and central station. Referring to FIG. 3, the central location 11 has an answer channel or address. All of the nodes 13 specify the answer channel when communicating with the central location 11. The central location 11 also has data channels or addresses for receiving the data or information from the nodes 13. The central location 11 has a data channel manager, which manages the flow of data from the nodes to the various central location channels. The answer and data channels and the data channel manager are implemented in software on the central location computer 21.

The nodes 13 initiate communication with the central location 11. Because there typically may be several nodes within communication range of the central location, each node includes a node identifier in each message or communication sent. The node identifier is sent with each communication by the node. Likewise, each communication sent by the central location has a node address that corresponds to the intended recipient node. The node address is unique to each node and allows the node to determine that the communication is intended for that node. If a first node receives a communication with a node address of another node, the first node will ignore the communication.

Because a node initiates communication with the central location, and because the node typically does not know when it is in communication range with the central location, the node periodically sends channel requests.

The present invention handles all node requests for channels through the answer channel. The data channel manager holds the answer channel open for channel requests from the nodes. When a node requests a channel, the node request is made on the answer channel. If there is an open data channel, the data channel manager then forwards the channel request to an open data channel. The node then communicates with the central station 11 on the assigned data channel. In addition, the data channel manager opens the answer channel for other channel requests from nodes. A subsequent channel request from another node is handled the same, and is routed to an open data channel. If there is not an open data channel, then the node's channel request is denied and the data channel manager frees the answer channel for another request. If data is not transmitted from the node for some period of time, the data channel is freed, either upon request of the node, or by the central location itself. The present invention thus minimizes unused channels and allows for the efficient use of communications on the network. Some nodes can be communicating with the central station through data channels while another node is requesting a channel through the answer channel.

FIG. 3 illustrates a successful connection, data transfer and disconnection between a node and the central location. In FIGS. 3-6, the sequence of events is from top to bottom with the top events occurring before the bottom events. In FIG. 3, a node 13 requests a channel from the central location 11, by transmitting a wireless message. The request includes the address of the answer channel, as well as an identifier for the specific requesting node. All requests from all nodes specify the address of the answer channel. At the central location, the answer channel handles the node's request. The answer channel then requests a data channel from the data channel manager. The data channel manager determines if there are any unused data channels and if so provides an unused data channel identifier to the answer channel. The answer channel forwards or passes the node message or request to the unused data channel. The answer channel is now freed. Freeing the answer channel allows the answer channel to receive and process other requests from other nodes, or subsequent requests from the same node. The data channel then sends an accept connection response or message to the node. At this point in time, the data channel is unavailable for use by another node. This response by the data channel includes the address of the specific node. The node in turn responds to the accept connection message by transmitting its data. The node continues to use the same address as before, when a channel was requested, which is the address of the answer channel. Thus, to the node, the process of passing a request from the answer channel to a data channel is transparent and invisible. The node transmits its channel request, data and other messages to the answer channel or address. The handing off or passing off of the node from the answer channel to the available data channel is performed internally to the central station by the data channel manager. In the preferred embodiment, the data transmission from the node is burst so that all of the node data is sent in a relatively short period of time. The data channel manager routes the node's data and other messages to the proper data channel. When the data is received by the data channel, the data channel responds with an acknowledgement. The node then sends a disconnect message. The node disconnects because all of its data has been transmitted to the central location and no further communication is required. If the node has additional data to be transmitted, it does not send a disconnect message. When the data channel receives the disconnect message from the node, the data channel is then freed, wherein the data channel can receive messages from another node. This is communicated to the data channel manager.

The central station 11 implements the answer and data channels, as well as the data channel manager. The central station stores the data from the node in the database 23. Also stored in the database are the node identifiers or addresses. The central station, by way of the computer 21, may process the node data and provide the processed information to the interface 25. The central station may also provide the unprocessed data to the interface.

Figure 4:
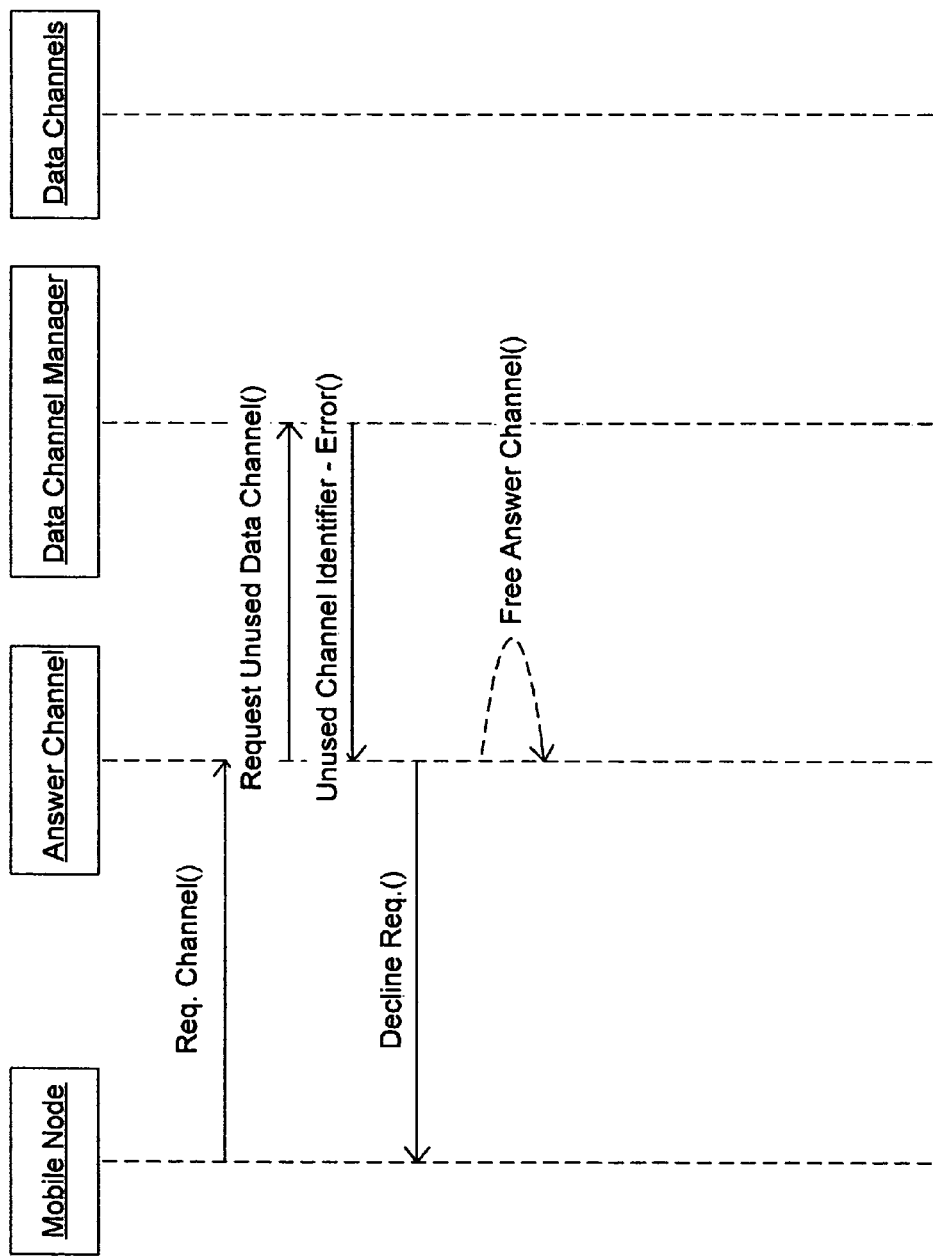
FIG. 4 illustrates an unsuccessful channel request.

FIG. 4 illustrates an unsuccessful data channel request. The node requests a channel as discussed with respect to FIG. 3. The answer channel receives the node request and forwards it to the data channel manager in the form of a request for an unused data channel. The data channel manager determines if there are any unused data channels. If all of the data channels are in use, then the data channel manager returns an unused channel identifier-error. The answer channel then declines the request for the node by way of a message sent to the node. The answer channel is then freed to receive other requests. The node will then repeat its request for a channel after a period of time has passed. This period of time is typically programmed into the node. For example, the node may wait 20 seconds before repeating its request.

When the answer channel processes a request for channel message from a node, the answer channel is in use for a short period of time. It is possible that when the answer channel is in use, another node may request a channel. If this happens, the second node will be denied the connection because the answer channel is busy with the first node. The second node then retries its request after a predetermined period of time. Because the answer channel is only in use for a short amount of time processing each request, the chance of encountering a busy answer channel is minimized.

Figure 5:
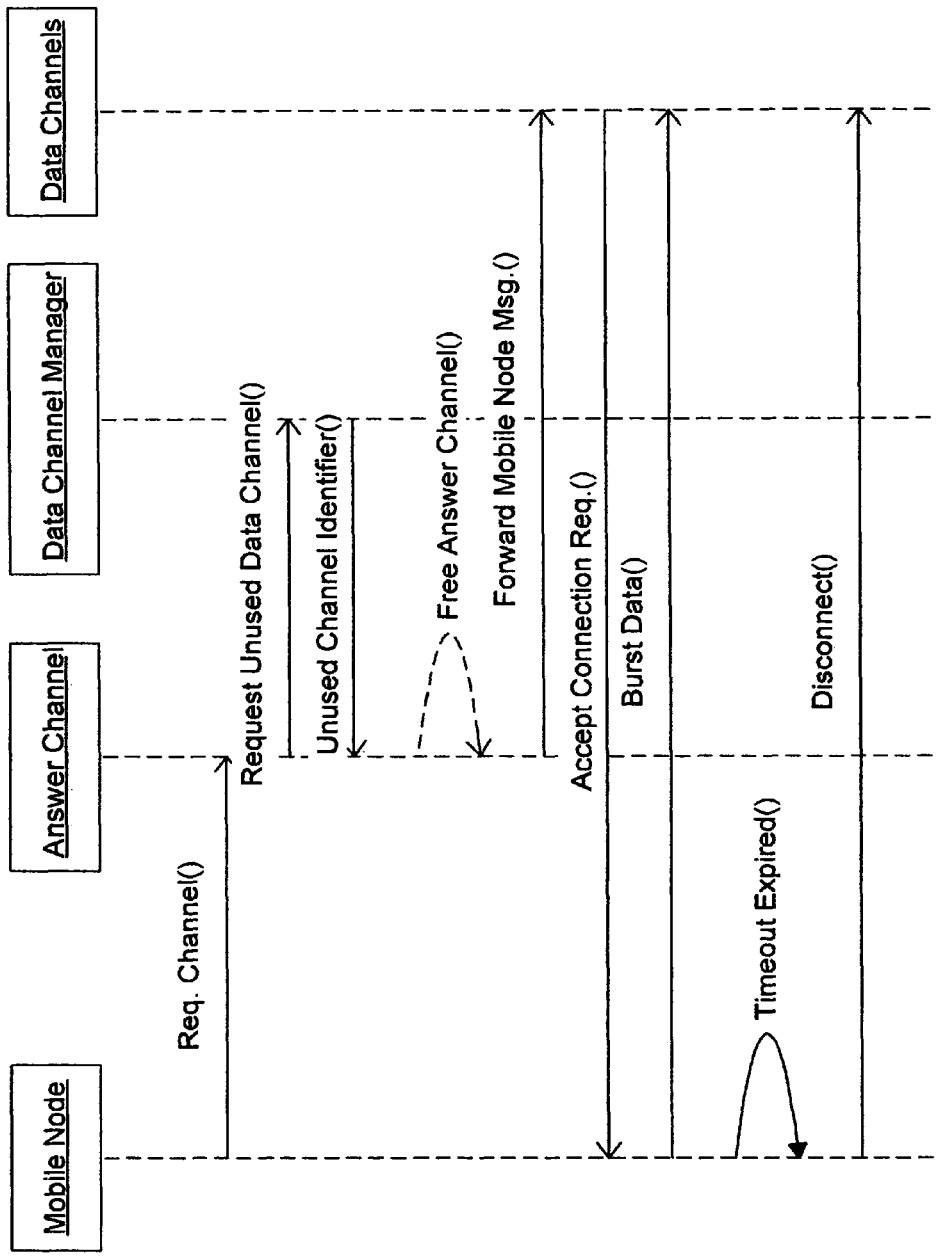
FIG. 5 illustrates the closing of the channel after timing out at the node.

FIG. 5 illustrates a successful connection and data transfer and time out by the node. This process is substantially similar to that discussed in FIG. 3, from the time that the mobile node requests the channel to the time mobile node burst transmits data. After successfully burst transmitting data, the data channel will send an acknowledge data message. However, if the node does not receive the acknowledge data message, or has some additional data to transmit, then it will not send a disconnect message. Nevertheless, the node has a time out process for disconnection. After a predetermined period of time has expired, then the node will send a disconnect message and the data channel is returned to the pool of unused data channels. If the data sent to the central location has not been acknowledged, then the node will try to reestablish communications and resend the data. If the data was acknowledged, then the node will reestablish communications and transmit the previously untransmitted data. If no further data is to be sent, then the node does not try to reestablish communications. The timeout period can be set to a relatively short time, such as 10-30 seconds.

If the data transmission is unsuccessful, this would be detected by a checksum or other error detection scheme. If the data transmission is unsuccessful, then the central location will respond with a no acknowledgement, thereby signaling the node that it received the information but the information was corrupt. The central location will then disconnect the node. If this occurs, the node will attempt to reestablish communications and retransmit the data.

Figure 6:
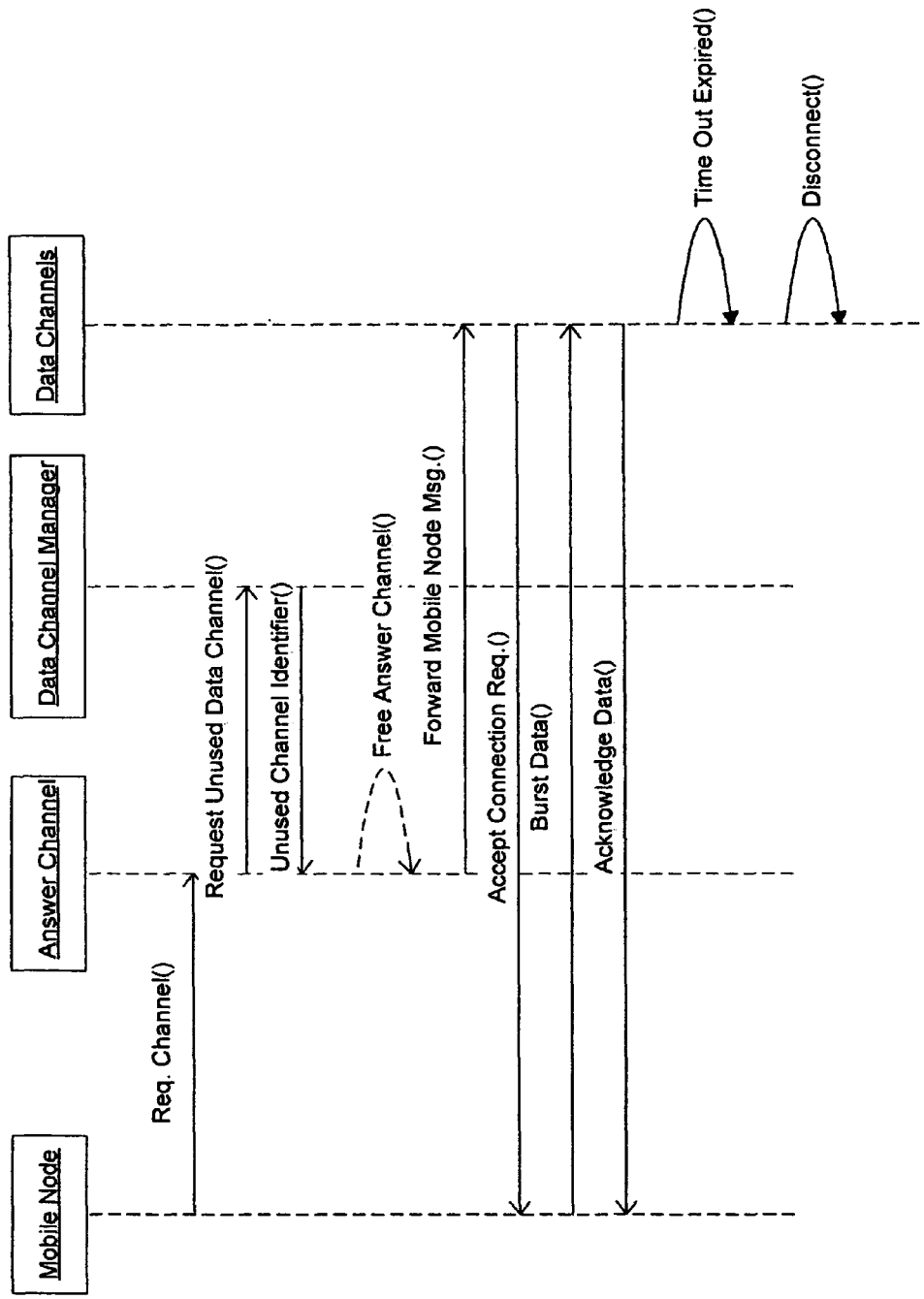
FIG. 6 illustrates the closing of the channel after timing out at the central location.

It is possible for the node to move in and out of the communications range of the central location while transmitting. If this happens, the message will be partially transmitted to the central location, resulting in a no acknowledgement and a disconnect from the system. Alternatively, if the node moves out of range after the message has been sent but before the node requests a disconnect, the central location will have a time out starting at the initial connect. This is illustrated in FIG. 6. In FIG. 6, the steps from requesting a channel to acknowledge data are the same as in FIG. 3. When the time out occurs, the central location will disconnect the node and return the data channel to the pool of unused data channels.

The present invention provides several advantages. The present invention connects automatically when the nodes are in range of the central location. Prior art systems need to be in range before the connection is attempted or the system will try to connect on start up. By searching for a particular address and with a short connection message, the request for a channel by the node can be done repeatedly and quickly so that when the node is finally in range of the central location, the connection is made quickly.

The system automatically disconnects from the node side or the central location side after a period of inactivity. By monitoring the activity on the channel, bursting data over the channel and the quick connection time, it is reasonable to disconnect the channel when there is a short interval of inactivity. This will allow the mobile node to be disconnected very shortly after leaving the infrastructure wireless range and allowing the mobile nodes still in range more of a chance to connect with the central location.

Since the mobile node is only trying to connect to a particular address in the central location, its request can be made quickly and with more frequency. This allows the mobile node to connect quickly upon entering the service area and allows the quick disconnect of idle nodes since a reconnect does not take much time.

The mobile node conserves bandwidth by determining if a successful data transfer has occurred and not transmitting again until the data it has transmitted is updated. This allows other mobile nodes to transmit their information.

The foregoing disclosure and showings made in the drawings are merely illustrative of the principles of this invention and are not to be interpreted in a limiting sense.

The invention claimed is:

1. A method of managing communications between a central station and a plurality of nodes, the method comprising:
   at a one of the nodes, transmitting a channel request via an answer channel to a the central station;
   receiving the channel request at the central station through the answer channel;
   at the central station, determining among a plurality of data channels if a data channel is available;
   if a data channel is available, then passing the channel request of the one node from the answer channel to a one data channel, and freeing the answer channel to handle another channel request from a node;
   the one data channel transmitting an acknowledgement of connection to the one node;
   the one node transmitting data to the central station;
   at the central station, the one data channel receiving the data and sending an acknowledgement to the one node;
   the one node transmitting a disconnect message after sending data; and
   the one data channel receiving the disconnect message and disconnecting from the one node, wherein the data channel is now capable of communicating with another node.

2. A method of managing communications between a central station and a plurality of nodes, the method comprising:
   at one of the nodes, transmitting a channel request via an answer channel to a the central station;
   receiving the channel request at the central station through the answer channel;
   at the central station, determining among a plurality of data channels if a data channel is available;
   if a data channel is available, then passing the channel request of the one node from the answer channel to a one data channel, and freeing the answer channel to handle another channel request from a node;
   the one data channel transmitting an acknowledgement of connection to the one node;
   the one node transmitting data to the central station;
   at the central station, the one data channel receiving the data and sending an acknowledgement to the node;
   after an elapsed period of time, the one node transmitting a disconnect message; and
   the data channel receiving the disconnect message and disconnecting from the one node, and becoming capable of communicating with another node.

3. A central station that communicates with a plurality a nodes, comprising:
   a transceiver;
   a database;
   a processor comprising an answer channel, data channels and a data channel manager, the answer channel receiving channel requests from the Bodes and upon receiving a channel request the answer channel requests an unused data channel from the data channel manager, the data channel manager identifies a data channel that is not engaged in communicating with a node and upon identifying an unengaged data channel provides the data channel identification to the answer channel, the answer channel then passing the data channel request to the unengaged data channel, which data channel communicates with a first node, becoming an engaged channel, and the data channel manager frees the answer channel to receive other channel requests;
   wherein, the engaged data channel transmits an acknowledgement of connection to the first node;
   wherein, the first node transmits data to the central station;
   wherein, at the central station, the first data channel receives the data and sends an acknowledgement to the first node;
   wherein, the first node transmits a disconnect message after sending data; and
   wherein, the data channel receives the disconnect message and disconnects from the first node, wherein the data channel is now capable of communicating with another node.

4. A central station that communicates with a plurality of nodes, comprising:
   a transceiver;
   a database;
   a processor comprising an answer channel, data channels and a data channel manager, the answer channel receiving channel requests from the nodes and upon receiving a channel request the answer channel requests an unused data channel from the data channel manager, the data channel manager identifies a data channel that is not engaged in communicating with a node and upon identifying an unengaged data channel provides the data channel identification to the answer channel, the answer channel then passing the data channel request to the unengaged data channel, which data channel communicates with a first node, becoming an engaged data channel, and the data channel manager frees the answer channel to receive other channel requests;
   wherein, the engaged data channel transmits an acknowledgement of connection to the first node;
   wherein, the first node transmits data to the central station;
   wherein, at the central station, the first data channel receives the data and sends an acknowledgement to the first node;
   after an elapsed period of time, the first node transmits a disconnect message; and
   the data channel receives the disconnect message and disconnects from the first node, wherein the data channel is now capable of communicating with another node.

* * * * *